Figure 1:
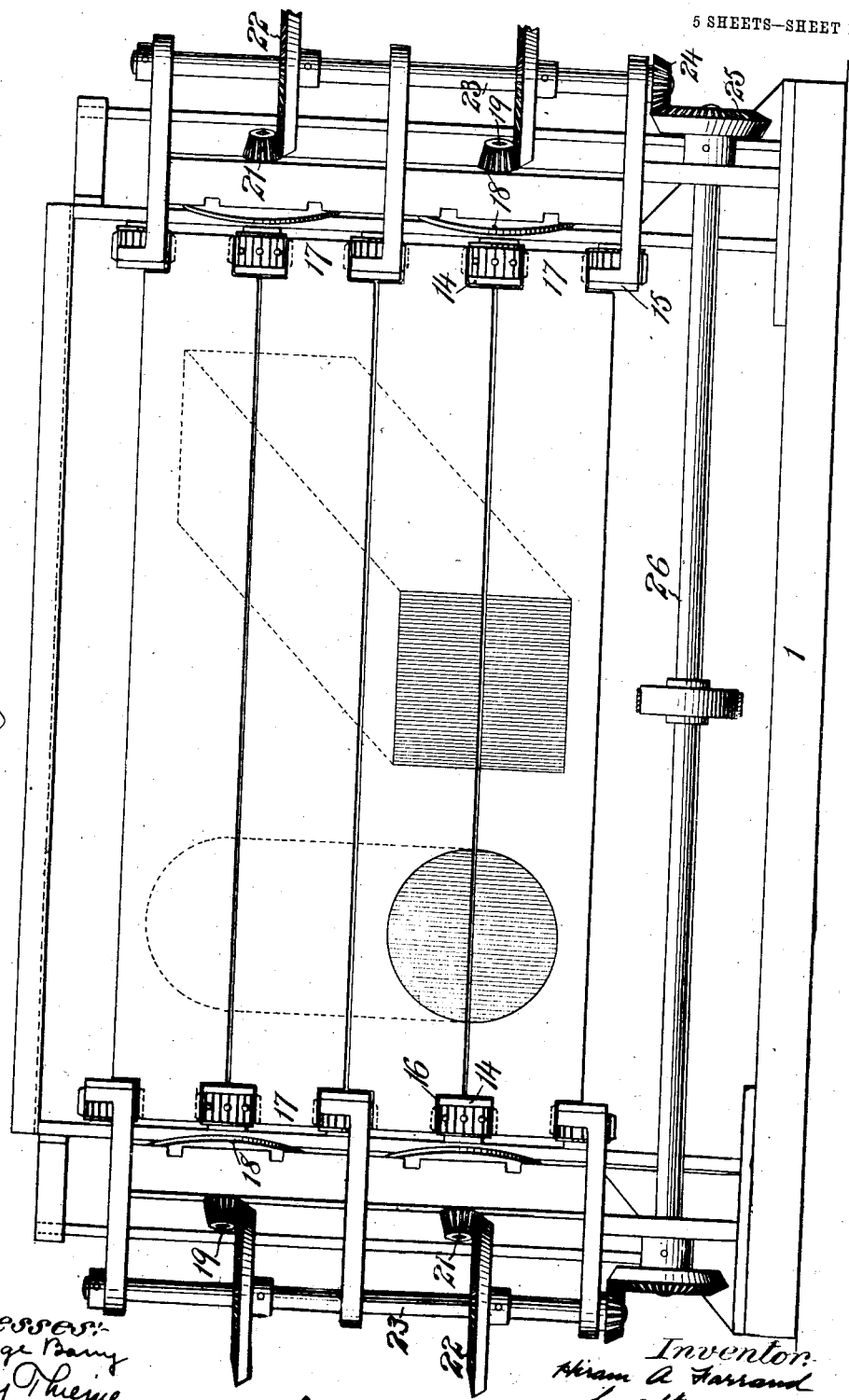

No. 822,730. PATENTED JUNE 5, 1906.
H. A. FARRAND.
APPARATUS FOR PRODUCING MOVING PICTURES.
APPLICATION FILED SEPT. 29, 1904.

5 SHEETS—SHEET 1.

Witnesses:
F. George Barry
Henry Thieme

Inventor.
Hiram A. Farrand
by attorney
Brown & Seward

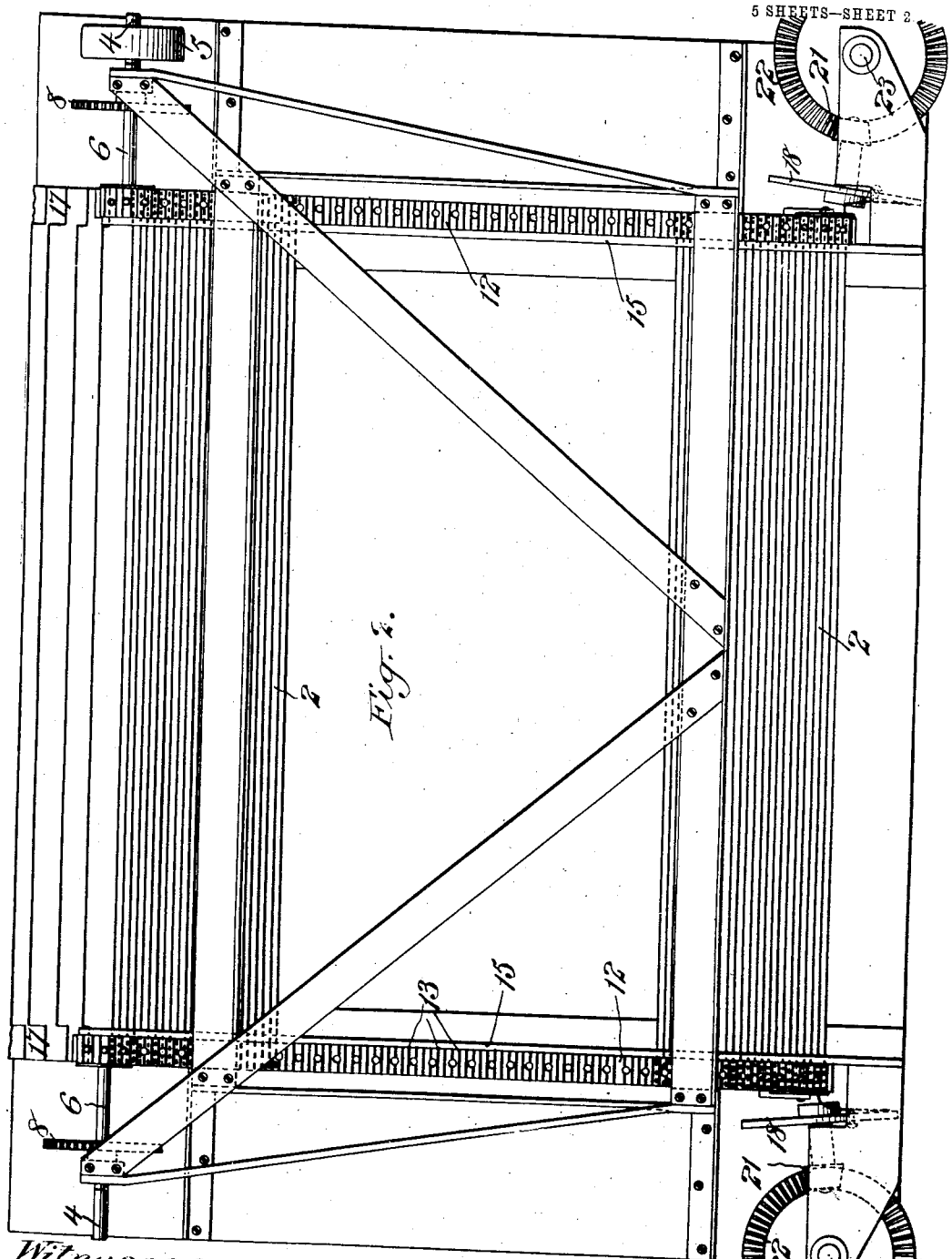

No. 822,730. PATENTED JUNE 5, 1906.
H. A. FARRAND.
APPARATUS FOR PRODUCING MOVING PICTURES.
APPLICATION FILED SEPT. 29, 1904.
5 SHEETS—SHEET 3.
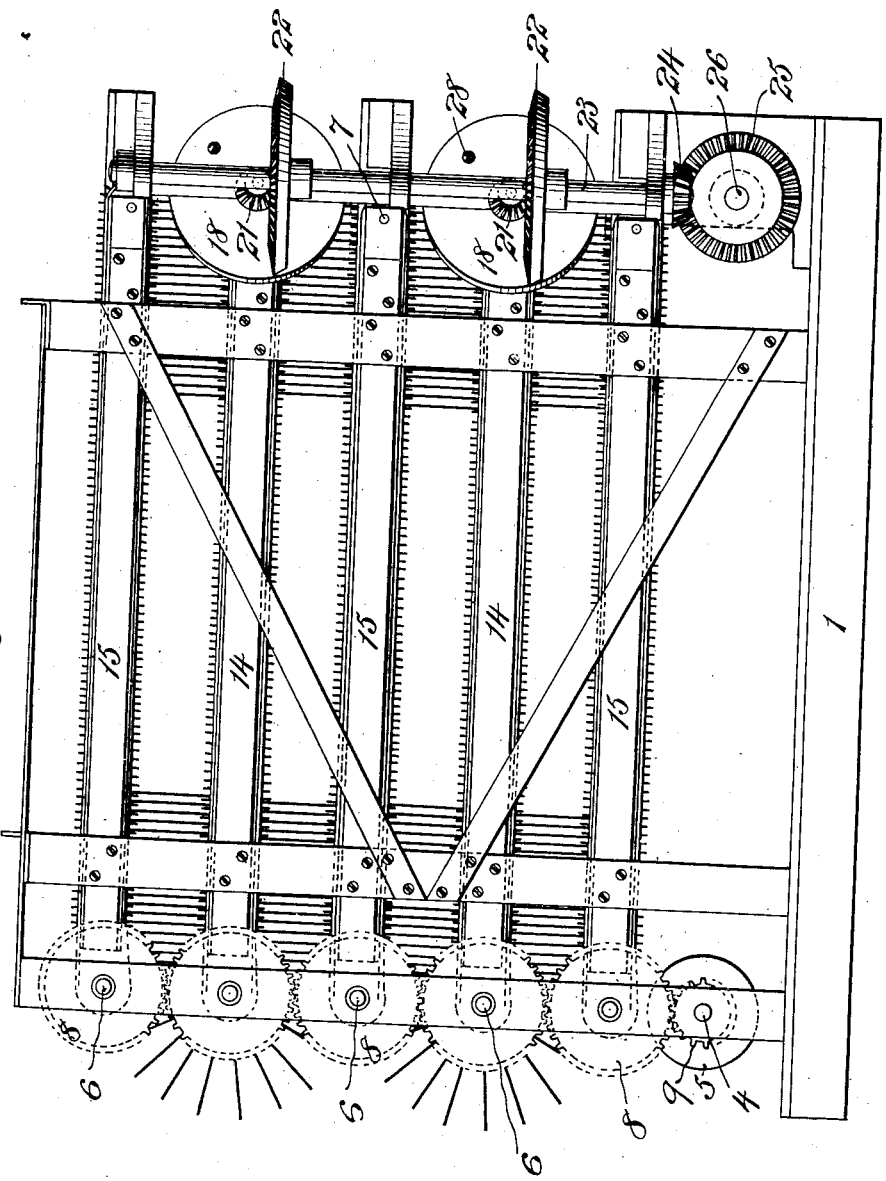

No. 822,730. PATENTED JUNE 5, 1906.
H. A. FARRAND.
APPARATUS FOR PRODUCING MOVING PICTURES.
APPLICATION FILED SEPT. 29, 1904.
5 SHEETS—SHEET 4.
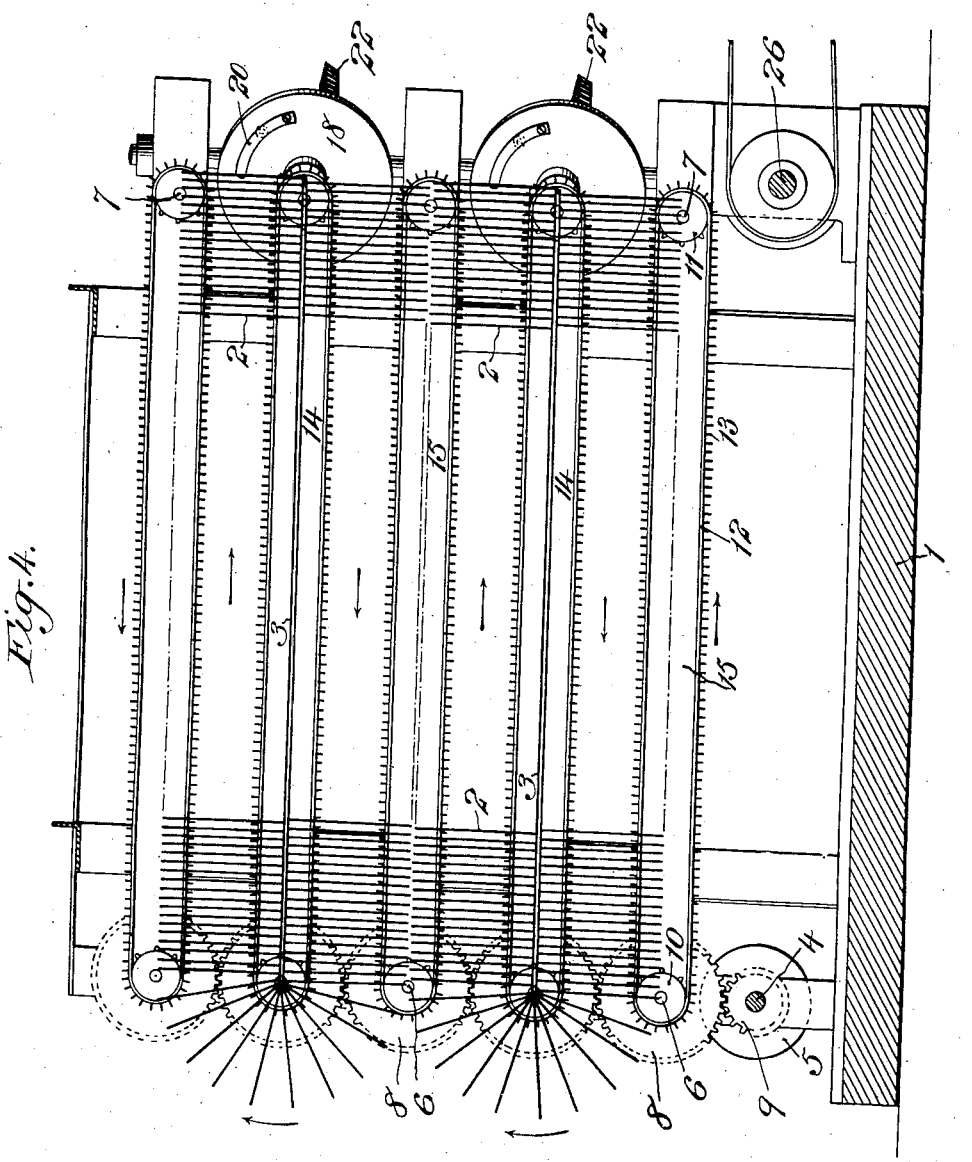

No. 822,730. PATENTED JUNE 5, 1906.
H. A. FARRAND.
APPARATUS FOR PRODUCING MOVING PICTURES.
APPLICATION FILED SEPT. 29, 1904.
5 SHEETS—SHEET 5.
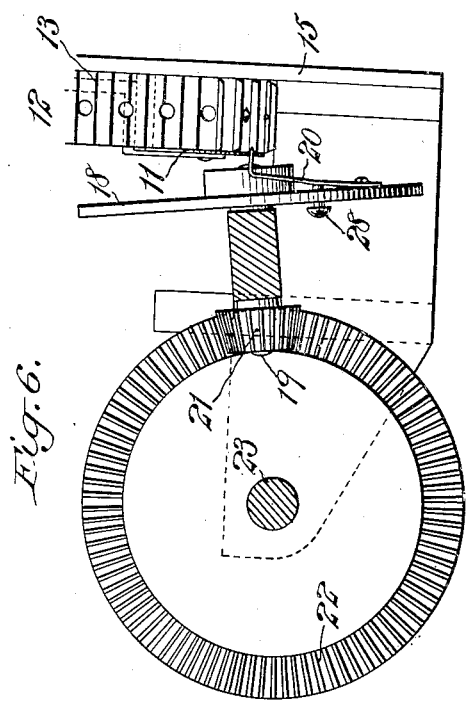
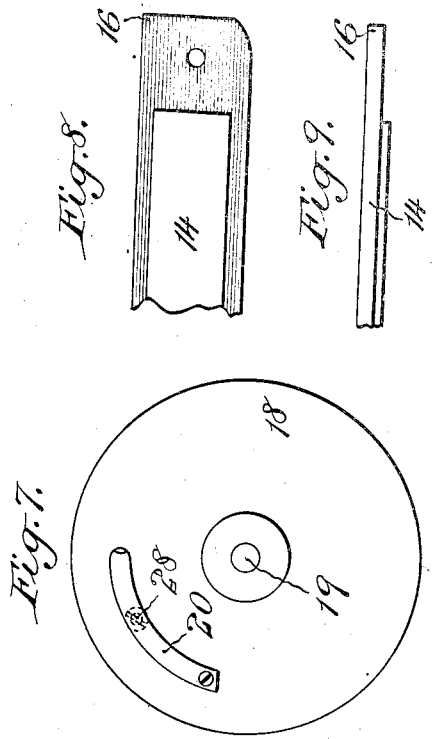
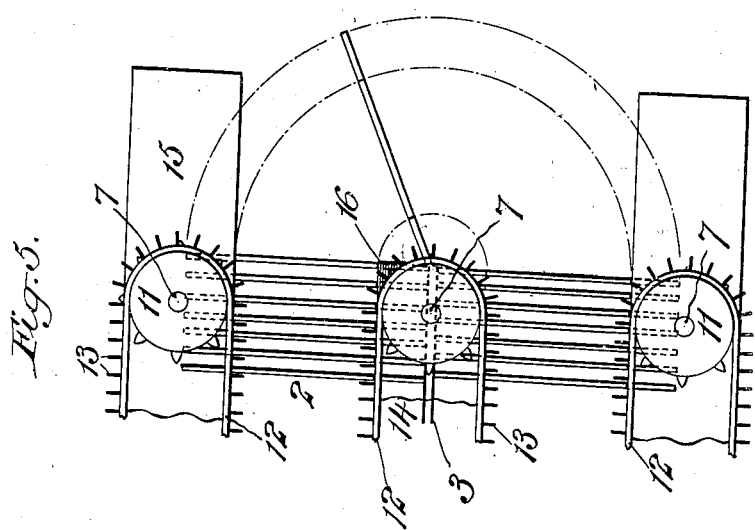
Witnesses:-
J. George Barry
Henry Thieme
Inventor:-
Hiram A. Farrand
by attorneys
Brown & Seward

UNITED STATES PATENT OFFICE.

HIRAM A. FARRAND, OF NEW YORK, N. Y.

APPARATUS FOR PRODUCING MOVING PICTURES.

No. 822,730.　　　Specification of Letters Patent.　　　Patented June 5, 1906.

Application filed September 29, 1904. Serial No. 226,530.

*To all whom it may concern:*

Be it known that I, HIRAM A. FARRAND, a citizen of the United States, and a resident of the borough of Manhattan, in the city and State of New York, have invented a new and useful Apparatus for Producing Moving Pictures, of which the following is a specification.

The object of this present invention is to provide a moving-picture apparatus having a picture plane, a plurality of series of flat surfaces—such, for instance, as cards having representations thereon—and means for moving corresponding flat surfaces of the different series into and out of the picture plane for causing the representations thereon to coact with one another to produce the desired effect.

A further object is to provide certain improvements in the construction, form, and arrangement of the several parts of the apparatus.

In the accompanying drawings, Figure 1 is a view in front elevation. Fig. 2 is a top plan view. Fig. 3 is a view in side elevation, and Fig. 4 is a longitudinal vertical section through the apparatus. Fig. 5 is an enlarged detail view, in longitudinal vertical section, showing one of the cards intermediate its upper and lower vertical positions. Fig. 6 is an enlarged detail view of the card-accelerator and its operating means. Fig. 7 is a detail face view of the accelerator-disk. Fig. 8 is an enlarged view in side elevation of the front end of one of the card-supporting bars, and Fig. 9 is a top plan view of the same.

This invention contemplates the use of a plurality of series of cards or other flat surfaces which are so arranged that successive cards of one series may be brought into the picture plane simultaneously with corresponding cards of the other series, so as to display the fronts of the said cards. The cards are then dropped simultaneously while in the picture plane, so as to disclose the backs of the cards. It is to be understood that the picture or other representation is borne by the several cards in the picture plane, each card bearing its part of the picture. It is also intended that the effect of a moving picture may be obtained by the continuous movement of the cards into and out of the picture plane, the swinging of each card from its upper to its lower position while in the picture plane being accelerated to prevent any blurred effect in the representation.

Two complete series of cards are represented in the accompanying drawings; but it is to be understood that a greater number of series may be employed, as required, to produce the desired effect.

A suitable framework 1 is provided for supporting the several series of cards to be hereinafter described, which framework may be of the desired construction to perform the work required. The cards are denoted by 2, and they are permanently secured at their inner end at the proper distances apart to an endless band 3 of flexible material. A main drive-shaft 4 is suitably mounted transversely across the apparatus at the back thereof, which shaft is provided with a pulley 5, through which rotary movement may be imparted to the shaft from any suitable source of power. (Not shown herein.) A back series of stud-shafts 6 is mounted in each side of the framework at the rear of the apparatus, and a corresponding vertical series of front stud-shafts 7 is mounted in the framework at each side of the front of the apparatus. Each vertical back series of shafts 6 is geared together by gearing 8, so that each shaft rotates in the opposite direction to its adjacent shaft and at the same speed. The lowermost gear 8 meshes with a gear 9 on the drive-shaft 4. Each pair of front and back side shafts 6 and 7 in the same horizontal plane is provided with a sprocket 10 on the rear shaft and a sprocket 11 on the front shaft. The endless belt 12 passes around the sprockets 10 and 11, which belt is provided with a plurality of teeth 13, spaced the same distance apart as the cards 2 on the band 3. It will thus be seen that the teeth on the adjacent sides of two adjoining belts travel in the same direction—rearwardly, for instance—while the adjacent teeth on a third belt and one of the above-named belts will travel in one of the same directions—forwardly, for instance. These teeth on the belts 12 serve to bring successive cards into a predetermined plane called, for convenience, the "picture" plane, release the cards, permitting them to fall, and then move the cards back out of the picture plane. This is accomplished as follows: Horizontal guide-bars 14 and 15 are secured to the sides of the framework 1 of the apparatus and extend from the back to the front of the same. The guide-bars 15 alternate with the guide-bars 14 and project a considerable distance to the front of their adjacent sprockets 11. The front ends of the guide-bars 14 have sharp corners 16 in a vertical line with the fronts of their adjacent sprockets 11. The cards themselves are provided with reduced ends 17, which project into the space between each pair of horizontal guide-bars 14 15. The cards in the upper group of cards when released will rest at their ends upon the top of the short guide-bar 14, and the reduced ends of the cards of the lower group of the same series will rest upon the top of the long guide-bar 15, just below the guide-bar 14, above referred to. It will thus be seen that the weight of the cards is taken upon the guide-bars and not upon the belts, which move the cards into and out of the picture plane.

The abrupt corners 16 at the front ends of the short guide-bars 14 are so arranged that when a card has been brought into the picture plane its reduced ends will be shoved off from engagement with the two short guide-bars which supported the card as the card was moved forward, thus permitting the card to fall from a front position in the upper group to a front position in the lower group of its series. It will thus be seen that both the front surfaces and the back surface of each card is disclosed in the picture plane.

I have provided means for accelerating the dropping of the front card in the upper group of each series, so as to prevent a blurred effect when the apparatus is in use, which means is constructed, arranged, and operated as follows: Upon each side of the apparatus adjacent to the front ends of the short guide-bars 14 I mount accelerator disks or wheels 18 on short shafts 19 at a slight angle to the shafts 7, on which the sprockets 11 are mounted. On the face of each disk or wheel 18 I provide a card-engaging finger 20, the end of which is brought back of the front card of the upper group of a series as the card reaches a position to drop. This wheel or disk is rotated at a predetermined speed with respect to the movement of the card-moving belt 12, so that the finger 20 will rapidly swing the card down into position to be engaged by the proper teeth to be moved rearwardly out of the picture plane. The shafts 19 of the accelerators are provided with bevel-gears 21, which mesh with bevel-gears 22 on a vertical shaft 23. The lower ends of the vertical shafts at the sides of the apparatus are provided with bevel-gears 24, which mesh with bevel-gears 25 on a horizontal cross-shaft 26. This cross-shaft 26 is driven at the high speed desired from a suitable source of power. (Not shown herein.) The finger 20 on the accelerator-disk 18 may be accurately adjusted, so as to engage the card at the right time by means of a screw 28.

From the above description it will be seen that the picture plane is composed of the alternating front and back faces of the cards. Each card is provided with its particular part of the representation to be displayed in the picture plane. The portions of the representation carried by the front and back faces of the successive cards of each series are so arranged as to coact with the cards of adjacent series to produce a moving-picture effect as cards are brought into and out of the picture plane. Any tendency to blur the picture is obviated by the use of the accelerators for rapidly swinging the cards when in the picture plane. Furthermore, the cards cannot become displaced, as they are permanently united at their inner ends to their flexible band at the required distances apart. Furthermore, it will be seen that the arrangement of the different series of cards is such that the free or outer ends of the cards of two adjacent series are brought into the picture plane in very close proximity to each other, and the inner ends of the upper and lower groups of each series are brought into the picture plane in close proximity to each other, thus producing a substantially continuous display-surface in the said picture plane.

What I claim is—

1. A moving-picture apparatus comprising a plurality of flat surfaces and means for moving the flat surfaces into and out of a common picture plane, the said surfaces having representations thereon arranged to coact with one another during the movement of the flat surfaces into and out of the picture plane to produce a moving-picture effect.

2. A moving-picture apparatus comprising an endless band, a plurality of cards permanently secured thereto and a separate belt having teeth engaging the cards for moving them successively into and out of a common picture plane.

3. A moving-picture apparatus comprising a plurality of endless bands, each having a series of cards permanently secured thereto and separate belts having teeth engaging common cards for moving them successively into and out of the picture plane.

4. A moving-picture apparatus comprising a plurality of series of cards and means for simultaneously moving corresponding cards of the several series into a common picture plane, independent means for reversing them and means for moving them out of the said plane.

5. A moving-picture apparatus comprising a plurality of series of cards, means for simultaneously moving corresponding cards of the different series into and out of a common picture plane and independent means for supporting the said cards during their forward and backward movements.

6. A moving-picture apparatus comprising a plurality of series of cards, means for simultaneously moving corresponding cards of the several series into a common picture plane, reversing the cards and moving them out of the said plane and independent means for supporting the cards.

7. A moving-picture apparatus comprising a series of cards, means for moving the cards into and out of a common picture plane and a guide-bar extending to the picture plane for supporting the cards during their forward movement.

8. A moving-picture apparatus comprising a plurality of series of cards, means for simultaneously moving corresponding cards of the several series into and out of a common picture plane and guide-bars extending to the picture plane for supporting the cards during their forward movement.

9. A moving-picture apparatus comprising a plurality of series of cards, means for simultaneously moving corresponding cards of the several series into a common picture plane, reversing the cards and moving them out of the picture plane and means for accelerating the reversing movement of the cards.

10. A moving-picture apparatus comprising a plurality of series of cards, means for simultaneously moving corresponding cards of the several series into a common picture plane, reversing the cards and moving them out of the said plane, means for accelerating the reversing movement of the cards and independent means for supporting the cards.

11. A moving-picture apparatus comprising a series of cards, means for successively moving the cards into a common picture plane, reversing the cards and moving them out of the said plane, an accelerator-wheel mounted diagonally with respect to the cards and arranged to engage a card during a portion of its rotary movement for accelerating the reversing movement of the card and means for rotating the wheel at a greater speed than the movement of the cards.

12. A moving-picture apparatus comprising a plurality of series of cards, means for simultaneously moving corresponding cards of the several series into a common picture plane, reversing the cards and moving them out of the said plane, accelerator-wheels mounted diagonally with respect to the cards and arranged to engage the cards during a portion of their rotary movements for accelerating the reversing movements of the cards and means for rotating the wheels at a greater speed than the movements of the cards.

In testimony that I claim the foregoing as my invention I have signed my name, in presence of two witnesses, this 26th day of September, 1904.

HIRAM A. FARRAND.

Witnesses:
    FREDK. HAYNES,
    C. S. SUNDGREN.